(12) United States Patent
Kuwano

(10) Patent No.: US 11,897,178 B2
(45) Date of Patent: Feb. 13, 2024

(54) PLASTIC BOTTLE MANUFACTURING DEVICE AND PLASTIC BOTTLE MANUFACTURING METHOD

(71) Applicant: Dai Nippon Printing Co., Ltd., Tokyo (JP)

(72) Inventor: Seiji Kuwano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 274 days.

(21) Appl. No.: 17/309,380

(22) PCT Filed: Nov. 29, 2019

(86) PCT No.: PCT/JP2019/046913
§ 371 (c)(1),
(2) Date: May 24, 2021

(87) PCT Pub. No.: WO2020/116358
PCT Pub. Date: Jun. 11, 2020

(65) Prior Publication Data
US 2022/0024109 A1    Jan. 27, 2022

(30) Foreign Application Priority Data

Dec. 4, 2018    (JP) .................................. 2018-227449

(51) Int. Cl.
*B29C 49/64* (2006.01)
*B29C 49/36* (2006.01)
(Continued)

(52) U.S. Cl.
CPC .......... *B29C 49/6445* (2013.01); *B29C 49/36* (2013.01); *B29C 49/786* (2013.01); *B29C 49/78* (2013.01); *B29L 2031/7158* (2013.01)

(58) Field of Classification Search
CPC . B29C 49/64; B29C 49/6445; B29C 49/6418; B29C 49/68; B29C 49/78; B29C 49/786; B29C 2049/7861
See application file for complete search history.

(56) References Cited

U.S. PATENT DOCUMENTS 7,354,538 B2    4/2008    Semersky et al.
7,887,742 B2    2/2011    Linke et al.
(Continued)

FOREIGN PATENT DOCUMENTS

CN    101432122 A    5/2009
CN    102837420 A    12/2012
(Continued)

OTHER PUBLICATIONS

Japanese Office Action (Application No. 2018-227449) dated Aug. 9, 2019 (with English translation).

(Continued)

*Primary Examiner* — Jerzi H Moreno Hernandez
(74) *Attorney, Agent, or Firm* — BURR PATENT LAW, PLLC

(57) ABSTRACT

A plastic bottle manufacturing device (50) includes a preform heating part (52) that includes a plurality of heating bodies (65), a blow-molding part (54) that molds a plastic bottle (20) by blow-molding a preform (10), and a preform temperature measuring part (53) that measures temperatures of the preform (10) at a plurality of measurement points (P) in a longitudinal direction of the preform (10). The plurality of measurement points (P) are provided in correspondence with the plurality of heating bodies (65). A control unit (70) controls an output of each heating body (65) based on an optimal temperature distribution at each measurement point (P) of the preform (10) that has been predetermined and an (Continued)

actually measured temperature distribution at each measurement point (P) of the preform (10).

5 Claims, 7 Drawing Sheets

(51) Int. Cl.
*B29C 49/78* (2006.01)
*B29L 31/00* (2006.01)

(56) References Cited

U.S. PATENT DOCUMENTS

| | | | |
|---|---|---|---|
| 2010/0007060 A1* | 1/2010 | Linke | B29C 49/78 |
| | | | 425/141 |
| 2012/0326345 A1* | 12/2012 | Gendre | B29C 49/786 |
| | | | 425/526 |
| 2014/0145375 A1* | 5/2014 | Feuilloley | B29C 35/0288 |
| | | | 264/492 |
| 2015/0117489 A1* | 4/2015 | McGurk | G01J 5/0808 |
| | | | 374/121 |
| 2020/0307064 A1* | 10/2020 | Finger | B29C 49/6472 |

FOREIGN PATENT DOCUMENTS

| | | |
|---|---|---|
| CN | 103442864 A | 12/2013 |
| FR | 2 976 514 A1 | 12/2021 |
| JP | H11-348106 A1 | 12/1999 |
| JP | 2007-503343 A1 | 2/2007 |

OTHER PUBLICATIONS

Japanese Office Action (Application No. 2018-227449) dated Nov. 19, 2019 (with English translation).
International Search Report and Written Opinion (Application No. PCT/JP2019/046913) dated Feb. 10, 2020.
English translation of International Preliminary Report on Patentability (Chapter I) (Application No. PCT/JP2019/046913) dated Jun. 17, 2021, 8 pages.
Chinese Office Action (Application No. 201980078652.8) dated Nov. 3, 2022 (with English translation).
Extended European Search Report dated Jul. 15, 2022 (Application No. 19892384.9).

* cited by examiner

PLASTIC BOTTLE MANUFACTURING DEVICE AND PLASTIC BOTTLE MANUFACTURING METHOD

The present disclosure relates to a plastic bottle manufacturing device and a plastic bottle manufacturing method.

BACKGROUND ART

Hitherto, a plastic bottle manufacturing device that manufactures plastic bottles (PET bottles) by blow-molding preforms has been known. In such a plastic bottle manufacturing device, in order to repeatedly mold plastic bottles having the same shape and the same physical property value, preforms that are controlled under the same temperature and the same humidity are used, and a preform-heating heater is controlled to realize a preset condition.

CITATION LIST

Patent Literature

PTL 1: Japanese Unexamined Patent Application Publication No. 2007-503343

However, actually, since there are variations in, for example, preform storage conditions, environmental temperatures where a blow-molding device is installed, and heater conditions, it is difficult to mold plastic bottles having the same shape and the same physical property value. Specifically, since storage temperatures and humidities of the preforms and environmental temperatures where the blow-molding device is set change, the temperatures of the preforms based on the heaters change. In this case, the stretching conditions of the preforms change, and the external dimensions and physical property values of the obtained plastic bottles change.

Hitherto, there has also existed a method of measuring the wall thicknesses of plastic bottles for one plastic bottle at a time by a measuring device and feeding back data thereof to one heater at a time (refer to PTL 1). However, when such a method is used, in order to obtain the data, the blow-molding needs to be performed on the assumption that a large number of plastic bottles are discarded beforehand. Therefore, since a large number of plastic bottles are discarded and the time for obtaining the data is lost, this method is not suitable for a line in which many varieties are to be manufactured.

The present disclosure provides a plastic bottle manufacturing device and a plastic bottle manufacturing method that can suppress occurrence of variations in the physical properties of plastic bottles caused by variations in the temperatures of preforms.

DISCLOSURE OF INVENTION

A plastic bottle manufacturing device according to an embodiment includes a preform heating part that heats a preform and that includes a plurality of heating bodies disposed in a longitudinal direction of the preform, a blow-molding part that molds a plastic bottle by blow-molding the preform heated by the preform heating part, a preform temperature measuring part that is provided between the preform heating part and the blow-molding part and that measures temperatures of the preform at a plurality of measurement points in the longitudinal direction of the preform, and a control unit that is connected to the preform temperature measuring part and that controls the preform heating part. In the plastic bottle manufacturing device, the plurality of measurement points are provided in correspondence with the plurality of heating bodies, and the control unit controls an output of each heating body of the preform heating part based on an optimal temperature distribution at each measurement point of the preform that has been predetermined and an actually measured temperature distribution at each measurement point of the preform measured by the preform temperature measuring part.

In the plastic bottle manufacturing device according to the present embodiment, the preform temperature measuring part may be a thermography.

In the plastic bottle manufacturing device according to the present embodiment, when an actually measured temperature at one measurement point of the preform differs from an optimal temperature at the one measurement point by a certain value or greater, the control unit may control the output of one heating body that is provided in correspondence with the one measurement point.

In the plastic bottle manufacturing device according to the present embodiment, when the actually measured temperature at the one measurement point of the preform differs from the optimal temperature at the one measurement point by the certain value or greater, the control unit controls the output of the one heating body that is provided in correspondence with the one measurement point and the output of another heating body differing from the one heating body.

In the plastic bottle manufacturing device according to the present embodiment, the control unit may set each measurement point at a width-direction center of the preform.

In the plastic bottle manufacturing device according to the present embodiment, the control unit may divide the preform into a plurality of zones in the longitudinal direction and may set each measurement point at a location at which a temperature is highest in a corresponding one of the zones.

A plastic bottle manufacturing method according to an embodiment includes a preform heating step of heating a preform by a preform heating part that includes a plurality of heating bodies disposed in a longitudinal direction of the preform, a blow-molding step of molding a plastic bottle by blow-molding the preform that has been heated, and a preform temperature measuring step of measuring temperatures of the preform at a plurality of measurement points in the longitudinal direction of the preform, the preform temperature measuring step being provided between the preform heating step and the blow-molding step. In the plastic bottle manufacturing step, the plurality of measurement points are provided in correspondence with the plurality of heating bodies, and an output of each heating body of the preform heating part is controlled based on an optimal temperature distribution at each measurement point of the preform that has been predetermined and an actually measured temperature distribution at each measurement point of the preform.

According to the present embodiment, it is possible suppress occurrence of variations in the physical properties of plastic bottles caused by variations in the temperatures of preforms.

DESCRIPTION OF EMBODIMENTS

An embodiment is described below with reference to each of FIGS. 1 to 9. Each of FIGS. 1 to 9 illustrates an embodiment.

(Structure of Preform)

Figure 1:
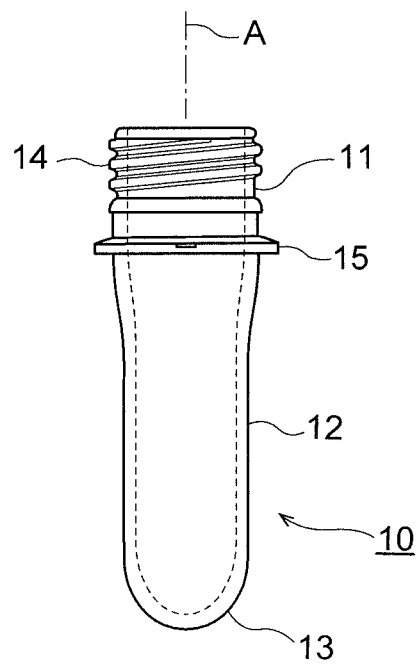
FIG. 1 is a front view illustrating a preform.

First, a general description of a preform is given with reference to FIG. 1.

As illustrated in FIG. 1, a preform 10 includes a mouth part 11, a body part 12 that is connected to the mouth part 11, and a bottom part 13 that is connected to the body part 12. Among these parts, the mouth part 11 includes a threaded part 14 and a flange part 15 that is provided below the threaded part 14. Note that the mouth part 11 corresponds to a mouth part 21 of a plastic bottle 20 described below, and has a shape that is substantially the same as the shape of the mouth part 21 of the plastic bottle 20. The body part 12 corresponds to a neck part 26, a shoulder part 27, and a body part 22 of the plastic bottle 20 described below, and has a substantially circular cylindrical shape. The bottom part 13 corresponds to a bottom part 23 of the plastic bottle 20 described below, and has a substantially hemispherical shape.

The preform 10 is formed by injection molding of synthetic resin pellets. As such a synthetic resin material, polyethylene terephthalate (PET), polyethylene (PE), polypropylene (PP), polyethylene naphthalate (PEN), or polycarbonate (PC) can be used. The preform 10 can be formed as a multi-layer molding preform having two or more layers. For example, a preform 10 having three or more layers may be formed with an intermediate layer being a resin (intermediate layer) having a gas barrier property, such as MXD6, MXD6+fatty acid salt, polyglycolic acid (PGA), ethylene-vinylalcohol copolymer (EVOH), or polyethylene naphthalate (PEN). Note that, as the intermediate layer, a resin that is blended with any of the various resins described above may be used.

Note that, in the present embodiment, "longitudinal direction" of the preform 10 is a direction in which the mouth part 11 and the bottom part 13 of the preform 10 are connected to each other, and is a direction parallel to a central axis A of the preform 10. "Width direction" of the preform 10 is a direction perpendicular to the central axis A of the preform 10.

(Structure of Plastic Bottle)

Next, a structure of a plastic bottle that is formed by using the preform described above is described with reference to FIG. 2.

Figure 2:
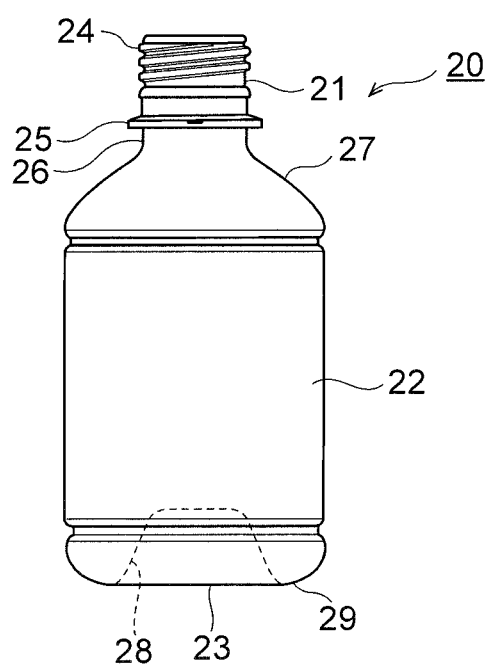
FIG. 2 is a front view illustrating a plastic bottle.

The plastic bottle 20 illustrated in FIG. 2 is obtained by subjecting the preform 10 described above to biaxial stretching blow-molding. The plastic bottle 20 includes the mouth part 21, the neck part 26 that is provided below the mouth part 21, the shoulder part 27 that is provided below the neck part 26, the body part 22 that is provided below the shoulder part 27, and the bottom part 23 that is provided below the body part 22.

Of these parts, the mouth part 21 includes a threaded part 24 that is screwed to a cap (not shown) and a flange part 25 that is provided below the threaded part 24. Note that the shape of the mouth part 21 may be a conventionally publicly known shape.

The neck part 26 is positioned between the flange part 25 and the shoulder part 27, and has a substantially circular cylindrical shape having a substantially uniform diameter. The shoulder part 27 is positioned between the neck part 26 and the body part 22, and has a shape having a diameter that gradually increases from the neck part 26 toward the body part 22.

The body part 22 has a circular cylindrical shape having a substantially uniform diameter as a whole. However, the shape of the body part 22 is not limited thereto. The body part 22 may have a polygonal cylindrical shape, such as a rectangular cylindrical shape or an octagonal cylindrical shape. Alternatively, the body part 22 may have a cylindrical shape having a horizontal cross section that is not uniform from an upper side toward a lower side. Although, in the present embodiment, the body part 22 has a substantially flat surface without irregularities, the body part 22 is not limited thereto. For example, the body part 22 may have irregularities, such as a panel or a groove.

The bottom part 23 has a recessed part 28 that is positioned at the center thereof, and a grounding part 29 that is provided around the recessed part 28. Note that the shape of the bottom part 23 is not particularly limited, and may be a conventionally publicly known bottom-part shape (for example, a petaloid bottom shape or a round bottom shape).

The thickness of the plastic bottle 20 at the body part 22 can be, for example, approximately 50 μm or greater and 250 μm or less, though not limited thereto. Further, the weight of the plastic bottle 20 can be 10 g or greater and 20 g or less, though not limited thereto. In this way, when the wall thickness of the plastic bottle 20 is small, the plastic bottle 20 can be reduced in weight.

Note that the shape of the plastic bottle 20 may be any shape as long as the shape is formed by subjecting the preform 10 to biaxial stretching blow-molding, and is not limited to the shape illustrated in FIG. 2.

(Plastic Bottle Manufacturing Device)

Next, a structure of a plastic bottle manufacturing device 50 is described with reference to FIGS. 3 to 6.

Figure 3:
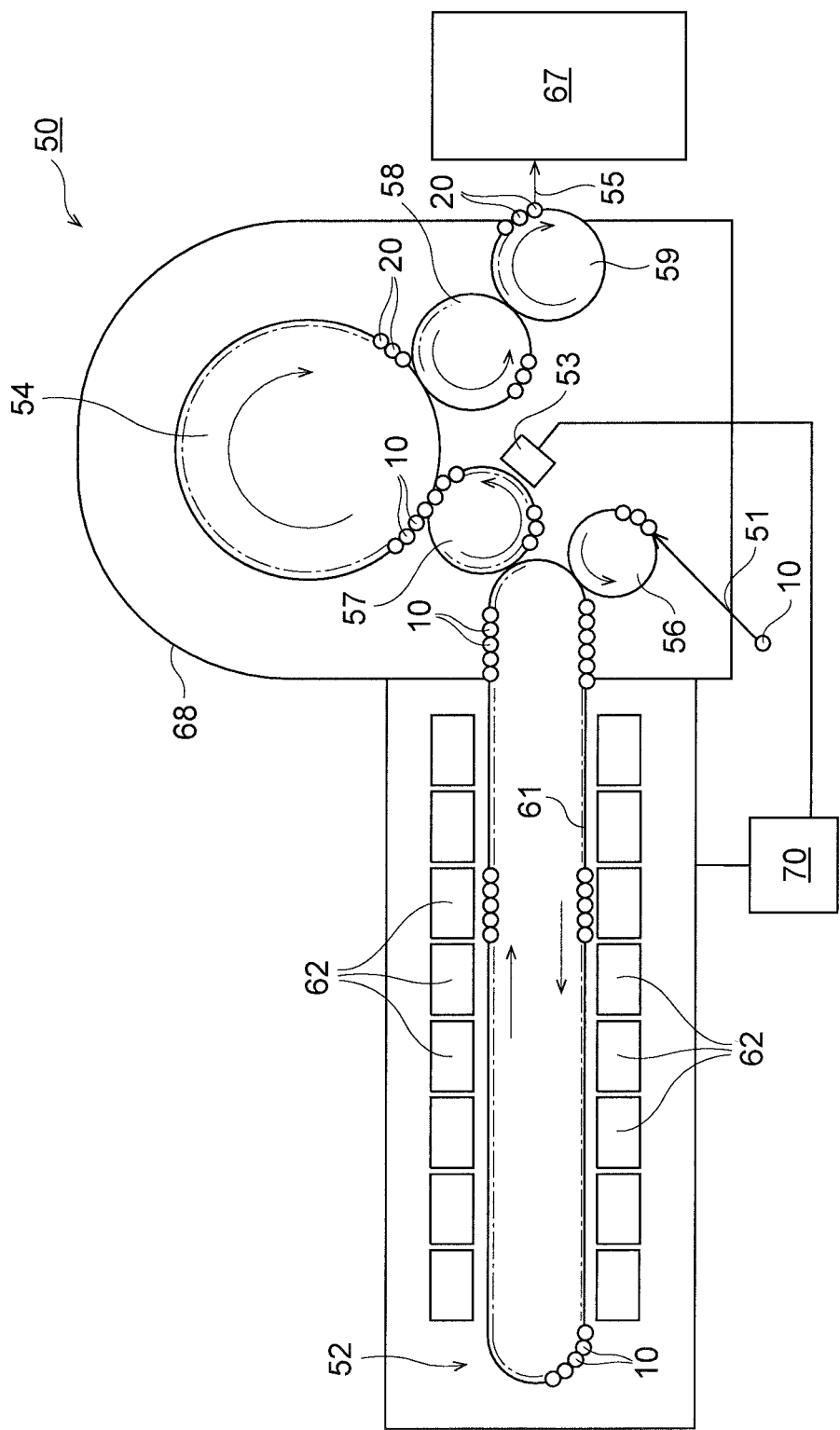
FIG. 3 is a schematic plan view illustrating a plastic bottle manufacturing device according to an embodiment.

As illustrated in FIG. 3, the plastic bottle manufacturing device 50 is a device that manufactures the plastic bottle 20 from the preform 10. Such a plastic bottle manufacturing device 50 includes a preform supply part 51, a preform heating part 52, a preform temperature measuring part 53, a blow-molding part 54, and a bottle discharge part 55. The preform supply part 51, the preform heating part 52, the preform temperature measuring part 53, the blow-molding part 54, and the bottle discharge part 55 are disposed in this order in a transport direction of the preform 10 and the plastic bottle 20.

Among these parts, the preform supply part 51 is a part to which the preform 10 is supplied from outside the plastic bottle manufacturing device 50. A rotary-like first transport rotary 56 that rotates and transports the preform 10 is disposed adjacent to the preform supply part 51. The preform 10 that is supplied from the preform supply part 51 is sent to the preform heating part 52 via the first transport rotary 56.

The preform heating part 52 includes a transport mechanism 61, and heater boxes 62 that are provided around the transport mechanism 61. Of these, the transport mechanism 61 has a substantially race-track shape in plan view, and is capable of transporting multiple preforms 10 continuously in a fixed direction (in FIG. 3, a clockwise direction in plan view).

Figure 4:
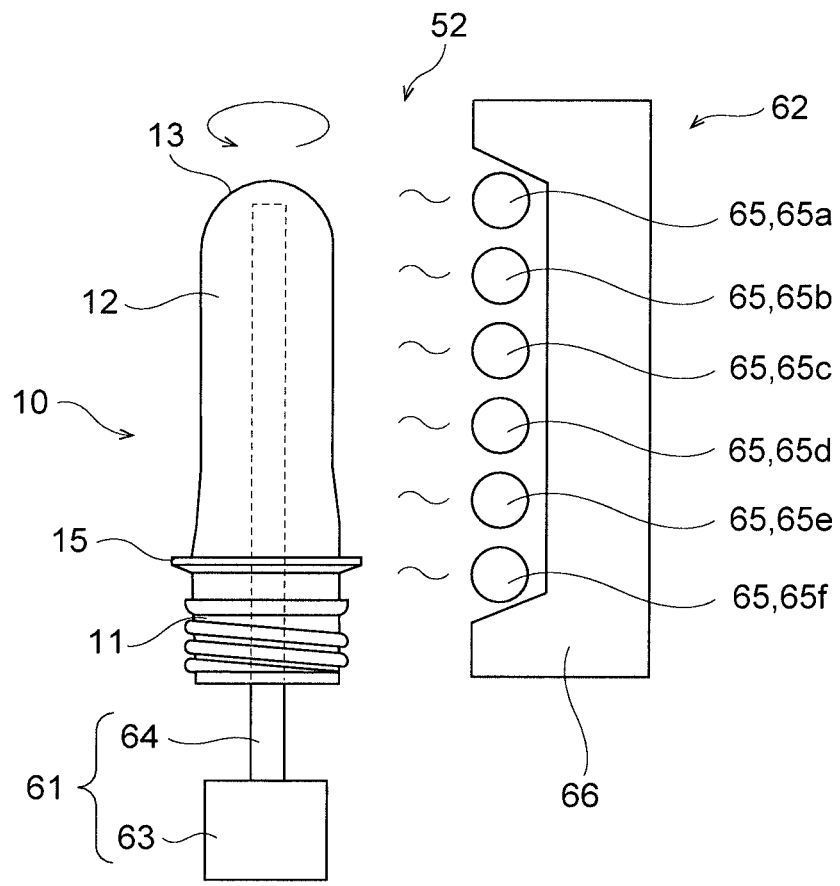
FIG. 4 is a schematic view of a preform heating part of the plastic bottle manufacturing device when viewed in a direction of movement of the preform.

As illustrated in FIG. 4, the transport mechanism 61 includes base parts 63 that move and transport mandrels 64 that protrude upward from the base parts 63. The transport mandrels 64 are provided in correspondence with the respective preforms 10, and each preform 10 is supported by the transport mandrel 64 corresponding thereto with the mouth part 11 of each preform 10 facing downward. Each preform 10 is transported in the directions of arrows in FIG. 3 while each preform 10 rotates (turns on its axis) in a fixed direction by using the transport mandrel 64 corresponding thereto.

The production (transport) speed of the plastic bottles 20 (the preforms 10) in the plastic bottle manufacturing device 50 is desirably 400 bpm or greater and 1200 bmp or less, and can be set as appropriate. Here, bpm (bottle per minute) refers to the number of plastic bottles 20 (the preforms 10) that pass a particular location in one minute. Note that it is desirable that the transport speed of the plastic bottles 20 (the preforms 10) be maintained at a constant speed from when the production of the plastic bottles 20 is started by using the plastic bottle manufacturing device 50 to when the production of a predetermined number of plastic bottles 20 is completed. Therefore, the loss of balance in various set values that have been set for devices of respective steps, caused by changes in the transport speed of the plastic bottles 20 (the preforms 10), can be suppressed, and thus the plastic bottles 20 can be stably produced.

As illustrated in FIG. 3, the heater boxes 62 are provided around the transport mechanism 61. The heater boxes 62 heat the preforms 10 that are being transported by the transport mechanism 61 from around the preforms 10. The heater boxes 62 (16 heater boxes 62) are disposed in the direction of movement of the transport mechanism 61. In this case, the plurality of heater boxes 62 have the same structure. However, the plurality of heater boxes 62 may have different structures. The number of heater boxes 62 is not limited, and may be one or more.

Figure 5:
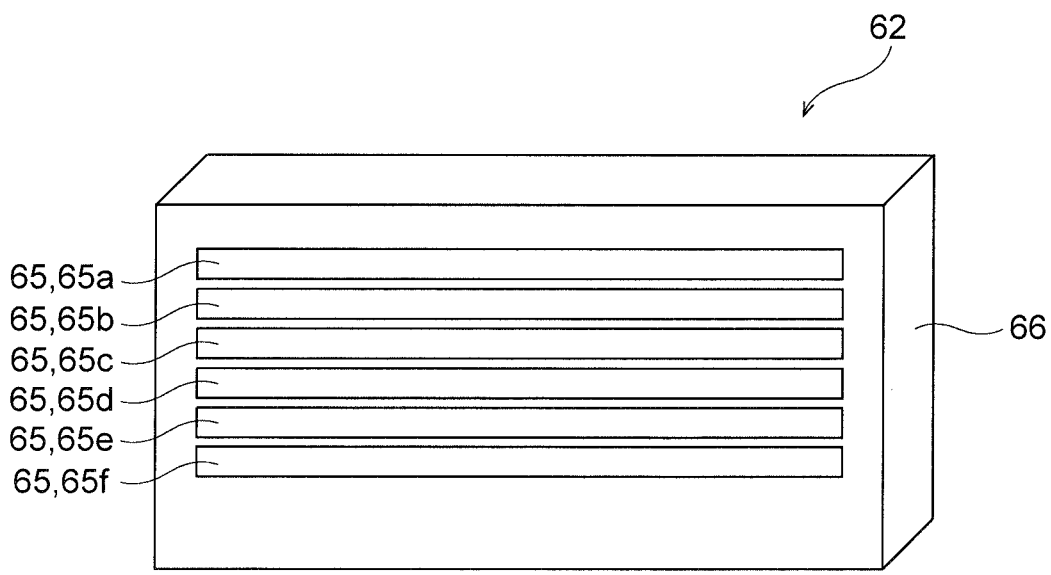
FIG. 5 is a schematic perspective view illustrating a heater box of the preform heating part.

As illustrated in FIGS. 4 and 5, each heater box 62 includes a plurality of (in this case, six) heating bodies (electric heaters) 65 that heat the preforms 10. Each heating body 65 has the shape of an elongated rod, and extends substantially parallel to the transport direction of the preforms 10 (horizontal direction). The plurality of heating bodies 65 are disposed in the longitudinal direction of the preforms 10 so as to be spaced apart from each other in an up-down direction.

Each heater box 62 includes a heater mounting part 66 and the plurality of heating bodies 65 that are mounted on the heater mounting part 66 and that are disposed side by side in the up-down direction. The preforms 10 that are being transported are heated by the heat from each heating body 65. The plurality of heating bodies 65 include, in order from an upper side (bottom-part-13 side) toward a lower side (flange-part-15 side), a first heating body 65a, a second heating body 65b, a third heating body 65c, a fourth heating body 65d, a fifth heating body 65e, and a sixth heating body 65f. Of these, the topmost first heating body 65a primarily heats the bottom part 13 of each preform 10, and the bottommost sixth heating body 65f primarily heats a portion of the body part 12 of each preform 10, the portion being near the flange part 15. The second heating body 65b to the fifth heating body 65e primarily heat an intermediate portion of the body part 12 of each preform 10. However, when the length of each preform 10 is small, for example, any one of the second heating body 65b to the fifth heating body 65e may heat the bottom part 13 of each preform 10. Note that, in the present embodiment, the first heating body 65a to the sixth heating body 65f may also be in general simply called "heating bodies 65".

The preform heating part 52 is connected to a control unit 70 (see FIG. 3), and is controlled by the control unit 70. That is, the plurality of heating bodies 65 of the preform heating part 52 are each individually controlled by the control unit 70, and the intensities of the plurality of heating bodies 65 can be adjusted. Specifically, the heating bodies 65 can be controlled to any output from an output of 0% (stop) to an output of 100% (maximum output). In this case, the larger the output of each heating body 65 is, the higher the temperature of each heating body 65 is, and the temperature of a portion of each preform 10 near the heating body 65 is increased. In contrast, the lower the output of each heating body 65 is, the lower the temperature of each heating body 65 is, and the temperature of a portion of each preform 10 near the heating body 65 is reduced. Therefore, by controlling the outputs of the plurality of heating bodies 65 as appropriate, it is possible to produce a temperature distribution in the longitudinal direction of each preform 10.

Further, as illustrated in FIG. 3, a second transport rotary 57 is disposed near the exit of the transport mechanism 61 of the preform heating part 52. The second transport rotary 57 is a device for transporting to the blow-molding part 54 each preform 10 heated by the preform heating part 52. Each preform 10 from the second transport rotary 57 is sent to the blow-molding part 54.

Figure 6:
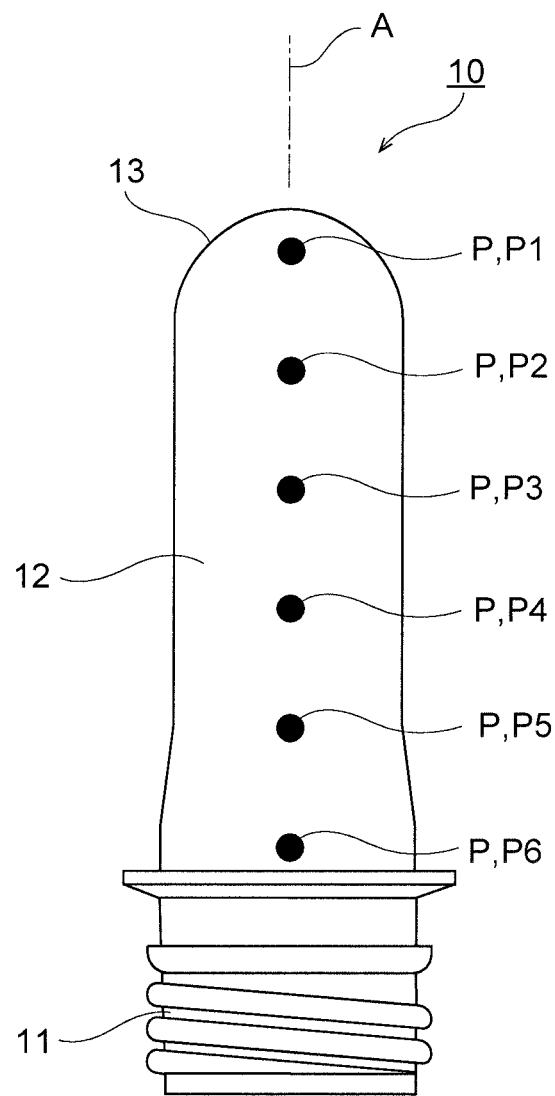
FIG. 6 illustrates a plurality of measurement points of the preform.

In the present embodiment, the preform temperature measuring part 53 is provided in the vicinity of the second transport rotary 57. The preform temperature measuring part 53 successively measures the surface temperature of each preform 10 that is transported by the second transport rotary 57. That is, as illustrated in FIG. 6, a plurality of measurement points P are provided on a preform 10 in the longitudinal direction thereof. The preform temperature measuring part 53 measures the actual temperatures of the preform 10 at the plurality of measurement points P of the preform 10.

For example, in FIG. 6, six measurement points P are disposed on the preform 10 in the longitudinal direction thereof. Specifically, the six measurement points P include, in order from the bottom-part-13 side toward the flange-part-15 side, a first measurement point P1, a second measurement point P2, a third measurement point P3, a fourth measurement point P4, a fifth measurement point P5, and a sixth measurement point P6. The first measurement point P1 to the sixth measurement point P6 correspond to the heating positions of the first heating body 65a to the sixth heating body 65f. That is, the number of measurement points P is the same as the number of heating bodies 65. For example, when the output of the third heating body 65c is increased, the measurement temperature at the third measurement point P3 is increased, and when the output of the fifth heating body 65e is reduced, the measurement temperature at the fifth measurement point P5 is reduced. Note that, in the present embodiment, the first measurement point P1 to the sixth measurement point P6 may also be in general simply called "measurement points P".

The preform temperature measuring part 53 is connected to the control unit 70. The preform temperature measuring part 53 measures the preform-10 actual surface temperatures measured at these six measurement points P with regard to all of the preforms 10 that are transported by the second transport rotary 57, and sends the actual surface temperatures to the control unit 70.

As the preform temperature measuring part 53, for example, a thermography can be used. The preform temperature measuring part 53, for which a thermography is used, analyzes infrared rays that come from each measurement point P of each preform 10, converts the temperature at each measurement point P of each preform 10 into a numerical form, and sends each temperature in numerical form to the control unit 70. Note that the preform temperature measuring part 53 only needs to be provided between the preform heating part 52 and the blow-molding part 54, and need not be provided in the vicinity of the second transport rotary 57.

When a thermography is used for the preform temperature measuring part 53, it is desirable to use a cool-type thermography as the preform temperature measuring part 53. By using the cool-type thermography, even when the transport speed of each preform 10 is a high speed (for example, 400 bpm or greater and 1200 bpm or less), it is possible to ensure the capturing of clear images having temperature distributions of the preforms 10 that move at a high speed, and to precisely measure the temperatures of the preforms 10.

The blow-molding part 54 is a device that molds plastic bottles 20 by blow-molding the preforms 10 heated by the preform heating part 52. In the blow-molding part 54, by subjecting the preforms 10 to biaxial stretching blow-molding with a blow-molding die 71 (described later), the plastic bottles 20 are formed.

A third transport rotary 58, a fourth transport rotary 59, and the bottle discharge part 55 are provided on a downstream side of the blow-molding part 54. Among these, the third transport rotary 58 and the fourth transport rotary 59 are each a device that rotates and transports the plastic bottles 20. The bottle discharge part 55 is a portion at which the plastic bottles 20 are discharged from the plastic bottle manufacturing device 50 to the outside of the plastic bottle manufacturing device 50. The plastic bottles 20 from the blow-molding part 54 are sent to an aseptic filling device 67 through the third transport rotary 58, the fourth transport rotary 59, and the bottle discharge part 55 successively. The aseptic filling device 67 is a device that fills the inside of the plastic bottles 20 with sterilized drinks (contents).

The control unit 70 is connected to at least the preform temperature measuring part 53 and the preform heating part 52. Based on the actually measured values of the temperatures of the preforms 10 measured by the preform temperature measuring part 53, the control unit 70 controls the heating of the preforms 10 at the preform heating part 52. Note that the control unit 70 may control not only the preform heating part 52 but also the blow-molding part 54 and/or the aseptic filling device 67.

The plastic bottle manufacturing device 50 further includes a chamber 68. The first transport rotary 56, the preform heating part 52, the second transport rotary 57, the preform temperature measuring part 53, the blow-molding part 54, the third transport rotary 58, and the fourth transport rotary 59 are accommodated inside the chamber 68. Such a chamber 68 may be a sterile chamber whose inside is kept in a sterile state.

(Plastic Bottle Manufacturing Method)

Next, a plastic bottle manufacturing method using the plastic bottle manufacturing device 50 according to the present embodiment is described with reference to FIG. 3 and FIGS. 7 to 9.

Figure 7A:
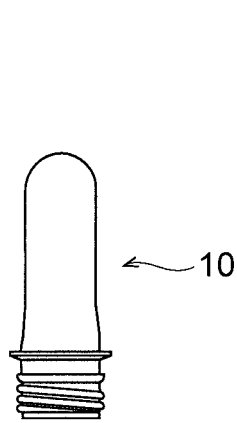
FIGS. 7A to 7E illustrate a plastic bottle manufacturing method according to an embodiment.

First, the preform 10 illustrated in FIG. 1 is prepared (preform preparing step: see FIG. 7A). As illustrated in FIG. 3, this preform 10 is supplied from the preform supply part 51 to the plastic bottle manufacturing device 50. Next, the preform 10 is transported from the preform supply part 51 to the preform heating part 52 via the first transport rotary 56.

Figure 7B:
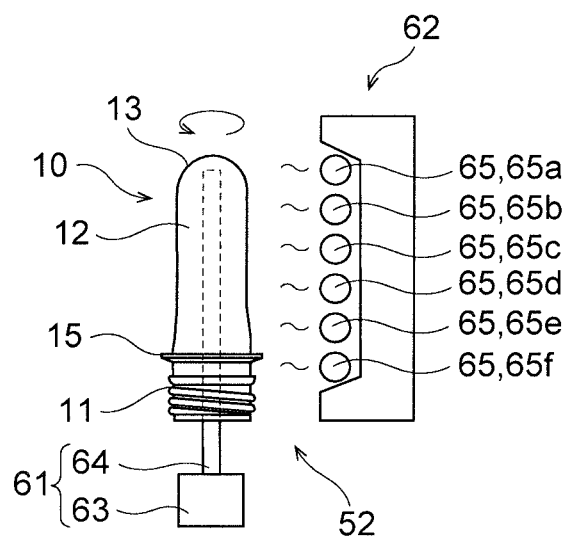
Figure 7C:
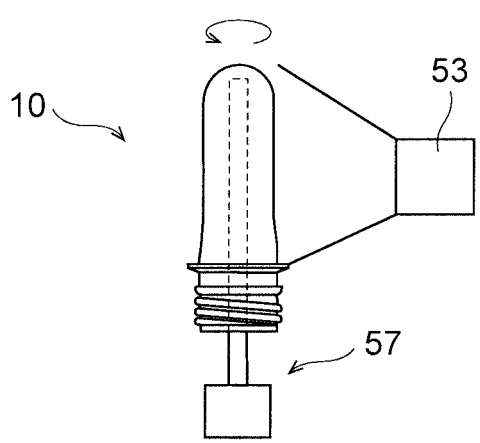
Figure 7D:
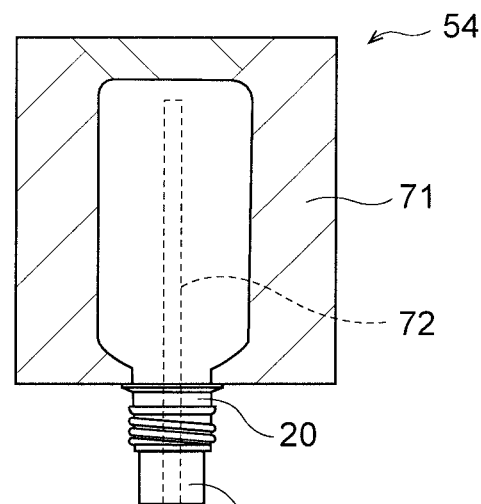
Figure 7E:
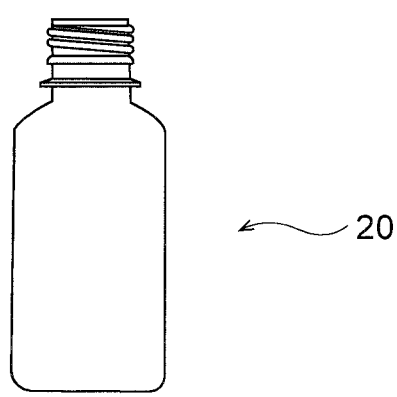

Next, while the preform 10 is transported by the transport mechanism 61 with the preform 10 being supported by the transport mandrel 64 of the preform heating part 52, the preform 10 is heated by the plurality of heater boxes 62 (preform heating step: see FIG. 7B). During this time, while the preform 10 rotates around the central axis A thereof (turns on its axis), the preform 10 is uniformly heated in a peripheral direction by the plurality of heating bodies 65 of each heater box 62. The plurality of heating bodies 65 are disposed apart from each other from the upper side (bottom-part-13 side) toward the lower side (flange-part-15 side), and each heat a different location on the preform 10 in the longitudinal direction. That is, the topmost first heating body 65a primarily heats the bottom part 13 of the preform 10, and the bottommost sixth heating body 65f primarily heats a portion of the body part 12 of the preform 10, the portion being near the flange part 15. The second heating body 65b to the fifth heating body 65e primarily heat an intermediate portion of the body part 12 of the preform 10.

After the heating step, the heated preform 10 is sent from the preform heating part 52 to the blow-molding part 54 via the second transport rotary 57 (see FIG. 3). During this time, the preform temperature measuring part 53 measures the temperatures of the preform 10 at the plurality of measurement points P in a length direction of the preform 10 (preform temperature measuring step: see FIG. 7C).

Figure 8A:
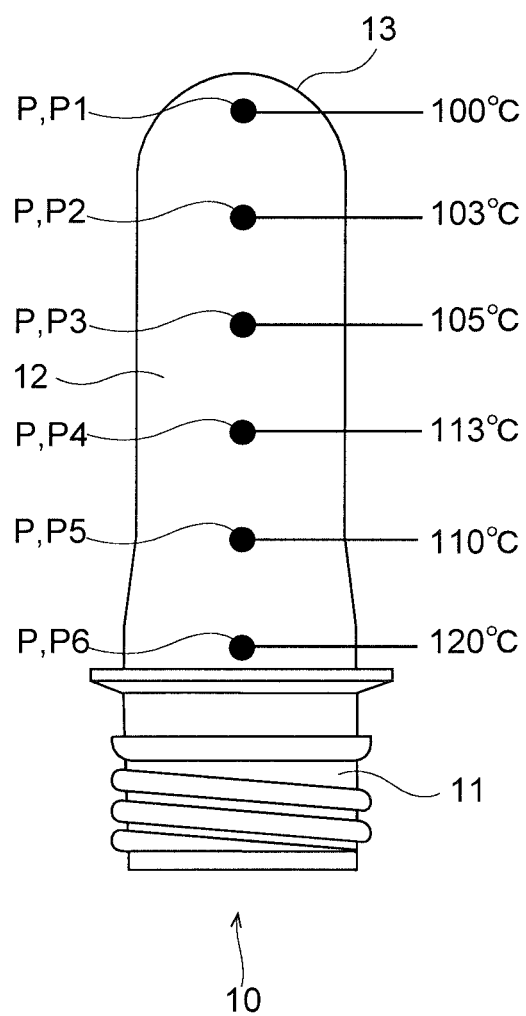
FIGS. 8A and 8B each illustrate a temperature distribution at a plurality of measurement points of a preform.

For example, as illustrated in FIG. 8A, the preform temperature measuring part 53 measures the actual temperatures of a preform 10 at a plurality of measurement points P of the preform 10. When the preform temperature measuring part 53 uses a thermography, the preform temperature measuring part 53 may analyze infrared rays that come from each measurement point P of the preform 10, and convert the temperature of the preform 10 at each measurement point P into a numerical form. In FIG. 8A, the actually measured temperature of the first measurement point P1 measured by the preform temperature measuring part 53 is 100° C., the actually measured temperature of the second measurement point P2 is 103° C., the actually measured temperature of the third measurement point P3 is 105° C., the actually measured temperature of the fourth measurement point P4 is 116° C., the actually measured temperature of the fifth measurement point P5 is 110° C., and the actually measured temperature of the sixth measurement point P6 is 120° C. The temperature distribution (actually measured temperature distribution) at each of such measurement points P is sent from the preform temperature measuring part 53 to the control unit 70. In this case, the preform temperature measuring part 53 may successively take photographs of images of a plurality of preforms 10 that pass at a high speed within a field of view of the preform temperature measuring part 53, and may send the photographed images to the control unit 70.

Figure 9A:
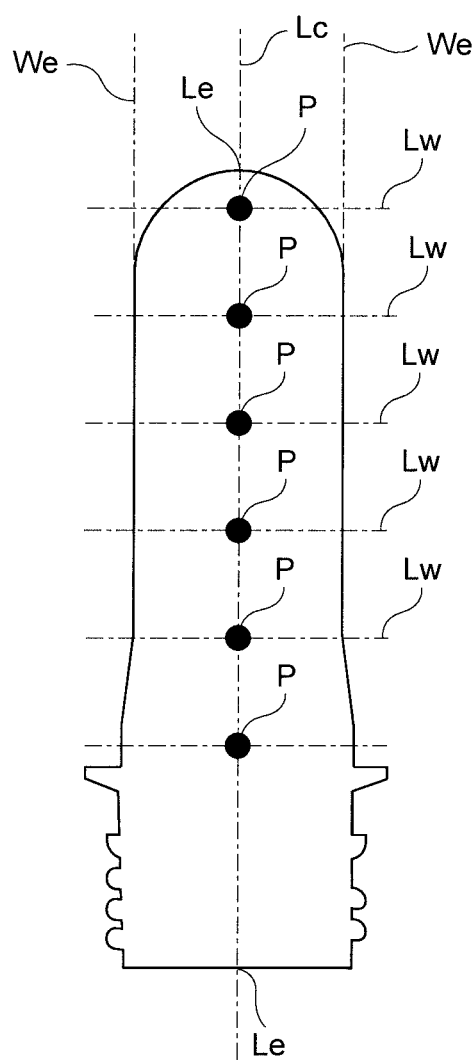
FIGS. 9A and 9B each illustrate a method of setting a plurality of measurement points of a preform.

As illustrated in FIG. 9A, the control unit 70 may set each measurement point P at the center of a preform 10 in a width direction (transverse direction in FIG. 9A) of the preform 10. For example, when the preform temperature measuring part 53 is a thermography, based on an image of the temperature distribution of each preform 10 in its entirety, the control unit 70 determines the positions of two longitudinal-direction ends Le and the positions of two width-direction ends We of each preform 10 by image processing. Then, each measurement point P is set at an intersection point of a corresponding transverse-direction line Lw and a vertical-direction line Lc, each transverse-direction line Lw extending through a location of a predetermined proportion from the two longitudinal-direction ends Le, the vertical-direction line Lc extending through the center between the two width-direction ends We. Note that when the temperatures of the preforms 10 are measured by a thermography, the measured temperatures tend to be lower than the actual temperatures with decreasing distance from the two width-direction ends We of the preforms 10. Therefore, by disposing each measurement point P at the center of each preform 10 in the width direction, it is possible to more precisely measure the surface temperature of each preform 10.

Figure 9B:
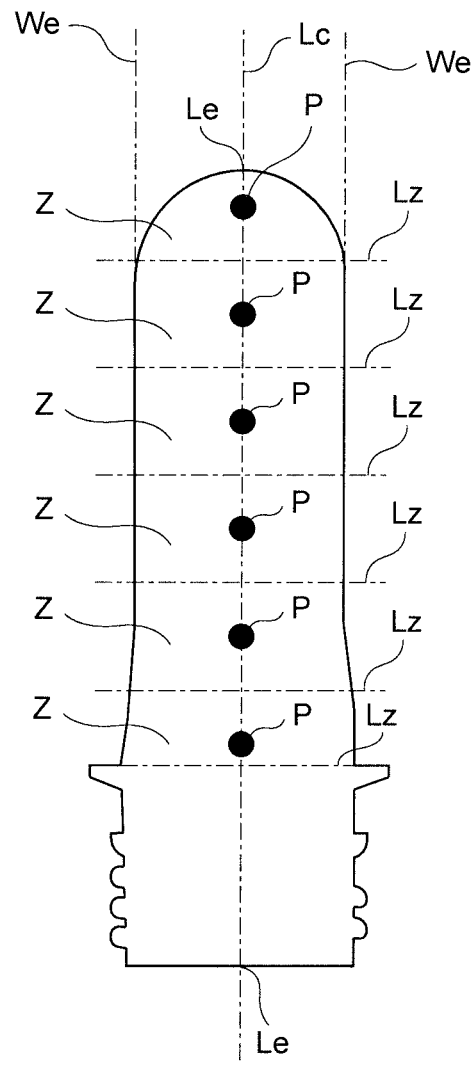

Alternatively, as illustrated in FIG. 9B, the control unit 70 may divide a preform 10 into a plurality of zones Z in the longitudinal direction and set each measurement point P at a location at which the temperature is the highest in a corresponding one of the zones Z. Note that the number of zones Z and the number of measurement points P are the same. For example, when the preform temperature measuring part 53 is a thermography, based on an image of the temperature distribution of each preform 10 in its entirety, the control unit 70 determines the position of each of two longitudinal ends Le of each preform 10 by image processing. Then, the plurality of zones Z that are separated by transverse lines Lz that each extend through a location of a predetermined proportion from the two longitudinal-direction ends Le are set. The locations at which the measured value is the highest inside the respective zones Z are the measurement points P. As described above, when the temperature of each preform 10 is measured by a thermography, the measured temperatures tend to be lower than the actual temperatures with decreasing distance from two width-direction ends We of the preform 10. Therefore, by causing the locations at which the measured value is the highest in the respective zones Z as the measurement points P, it is possible to more precisely measure the surface temperature of each preform 10.

Figure 8B:
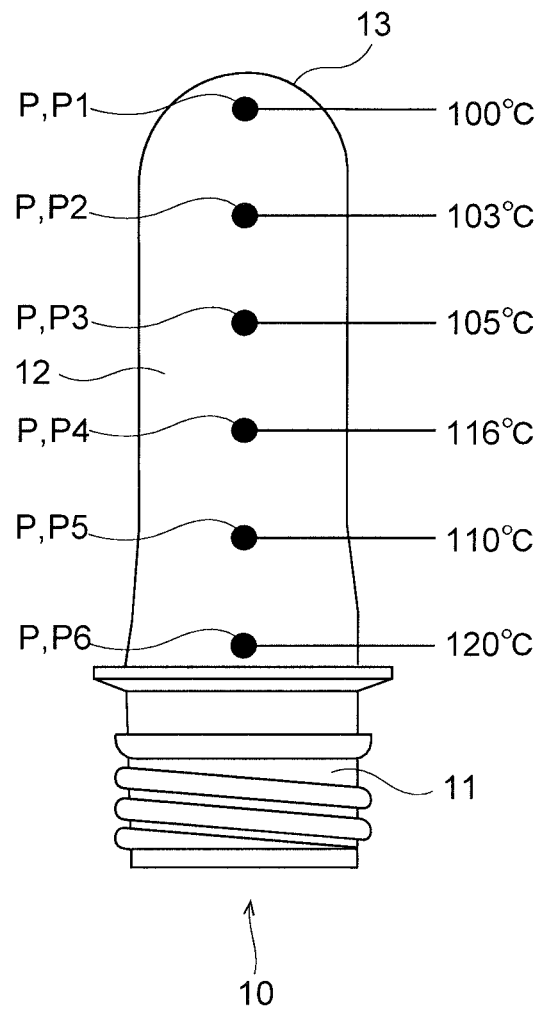

An optimal temperature distribution (target temperature distribution) at each measurement point P of each preform 10 that has been predetermined is stored in the control unit 70. For example, as illustrated in FIG. 8B, the optimal temperature of a first measurement point P1 is 100° C., the optimal temperature of a second measurement point P2 is 103° C., the optimal temperature of a third measurement point P3 is 105° C., the optimal temperature of a fourth measurement point P4 is 116° C., the optimal temperature of a fifth measurement point P5 is 110° C., and the optimal temperature of a sixth measurement point P6 is 120° C. Such an optimal temperature distribution may be measured beforehand when ordinary plastic bottles 20 are manufactured, or may be used as experimentally understood data. A plurality of types of optimal temperature distributions differing according to the preform 10 used or the plastic bottle 20 to be manufactured may be provided.

Next, based on the actually measured temperature distribution (FIG. 8A) at each measurement point P of the preform 10 measured by the preform temperature measuring part 53, and the previously stored optimal temperature distribution (FIG. 8B), the control unit 70 controls the output of each heating body 65 of the preform heating part 52. That is, when the actually measured temperatures at the respective measurement points P of the preform 10 differ from the optimal temperatures at the respective measurement points P by a certain value (for example, 1° C. to 3° C.) or greater, the control unit 70 controls the heating bodies 65 that are provided in correspondence with the measurement points P so that the actually measured temperatures at the respective measurement points P are closer to the respective optimal temperatures. For example, when the actually measured temperature distribution of the preform 10 illustrated in FIG. 8A and the optimal temperature distribution of the preform 10 illustrated in FIG. 8B are compared with each other, the actually measured temperature of the fourth measurement point P4 is 113° C., and is lower than the optimal temperature (116° C.) of the fourth measurement point P4. In this case, the control unit 70 increases the output of the fourth heating body 65d that is provided in correspondence with the fourth measurement point P4 so that the temperature of the fourth measurement point P4 of the preform 10 is increased. Note that when a particular heating body 65 (for example, the fourth heating body 65d) is to be controlled, particular heating bodies 65 (for example, the fourth heating bodies 65d) of all of the heater boxes 62 may be controlled all at once. Alternatively, only particular heating bodies 65 (for example, the fourth heating bodies 65d) of some heater boxes 62 may be controlled.

Note that it is desirable that the optimal temperature at each measurement point P of the preform 10 be in the range of 95° C. or greater and 130° C. or less. By causing the temperature of the preform 10 to be 95° C. or greater, it is possible to easily mold the plastic bottle 20 in the blow-molding step. When the temperature of the preform 10 becomes 130° C. or less, it is possible to make it less likely for the plastic bottle 20 to whiten (to be crystallized).

It is desirable that the control unit 70 control only the output of each heating body 65 of the preform heating part 52 based on data from the preform temperature measuring part 53. That is, it is desirable that the control unit 70 not adjust, for example, set values of other devices (such as the blow-molding part 54) based on the data from the preform temperature measuring part 53. Therefore, since the actually measured temperature distribution at each measurement point P of the preform 10 and the other devices are not directly linked to each other, the balance in, for example, the set values of the other devices are suppressed from being lost and control of the other devices is suppressed from becoming excessively complicated.

Next, the preform 10 that is sent to the blow-molding part 54 via the second transport rotary 57 is inserted into the blow-molding die 71, which is a molding die for blow-molding, at the blow-molding part 54. While the blow-molding die 71 moves continuously at a speed that is the same as the movement speed of the preform 10, the blow-molding die 71 is said to be in a closed state. After the blow-molding has been performed on the preform 10 inside the blow-molding die 71, the blow-molding die is said to be in an open state, and the plastic bottle 20 is taken out from the blow-molding die 71 (blow-molding step: see FIG. 7D).

During this time, the preform 10 is transported from the second transport rotary 57 to the blow-molding part 54, and is placed inside the blow-molding die 71 of the blow-molding part 54. A stretch rod 72 (see FIG. 7D) extends through a blow nozzle 73 that is positioned at the mouth part 11 of the preform 10 and is inserted into the preform 10. While the blow-molding die 71 moves, for example, primary blow air and secondary blow air are successively blown into the preform 10 via the draw rod 72, as a result of which the preform 10 expands until it becomes a plastic bottle 20, which is a final molded product, inside a cavity of the blow-molding die 71. After the plastic bottle 20 has been molded inside the blow-molding die 71 in this way, the blow-molding die 71 opens while moving, and the plastic bottle 20, which is a completed product, is taken out from the blow-molding die 71 (see FIG. 7E).

Next, the plastic bottle 20 is transported from the blow-molding part 54 (blow-molding step) to the inside of the aseptic filling device 67 (filling step) by the third transport rotary 58, the fourth transport rotary 59, and the bottle discharge part 55. Thereafter, inside the aseptic filling device 67, a sterilizer is put into the plastic bottle 20 and the inside of the plastic bottle 20 is kept aseptic. Thereafter, the inside of the plastic bottle 20 is filled with a drink (content) that has been sterilized inside the aseptic filling device 67 (filling step). Further, the plastic bottle 20 is hermetically sealed by a sterilized cap, and is attached with, for example, a label. Thereafter, the plastic bottle product that has been manufactured in this way is shipped to, for example, a retail store. In this way, the manufacturing steps (FIGS. 7A to 7E) that manufacture the plastic bottle 20 and the filling step of filling the plastic bottle 20 with the content may be continuously performed.

According to such an embodiment, the control unit 70 controls the output of each heating body 65 of the preform heating part 52 based on the optimal temperature distribution at each measurement point P of each preform 10 that has been predetermined and the actually measured temperature distribution at each measurement point P of each preform 10 measured by the preform temperature measuring part 53. Therefore, it is possible to suppress occurrence of variations in the physical properties of plastic bottles 20 caused by variations in the temperature of the preforms 10. In general, since, at the time of blow-molding, portions of the preforms 10 at which the temperature is high are easily stretched, the thicknesses of the plastic bottles 20 tend to become small. On the other hand, since portions of the preforms 10 at which the temperature is low are hard to stretch, the thicknesses of the plastic bottles 20 tend to become large. In contrast, according to the present embodiment, since the temperature distribution of each preform 10 can be brought close to the optimal temperature distribution, it is possible to maintain the thickness distributions of the plastic bottles 20 at optimal values.

According to the present embodiment, even when the environmental temperature of a place where the plastic bottle manufacturing device 50 is set changes, or, for example, there are variations in the states of the plurality of heating bodies 65, such as in the deterioration thereof, the actual temperature distributions of the preforms 10 can be controlled to be brought close to the optimal temperature distributions. Therefore, it is possible to maintain at a fixed quality the quality of plastic bottles 20 that are repeatedly manufactured.

According to the present embodiment, the plurality of measurement points P of a preform 10, where the temperatures are measured, are provided in correspondence with the plurality of heating bodies 65. Therefore, when the actually measured temperature of a particular measurement point P deviates from the optimal temperature, the control unit 70 can control only the particular heating body 65. Consequently, compared with when only one representative point of a preform 10 is measured, it is possible to precisely control the temperature of the preform 10.

Unlike, for example, when the wall thicknesses of plastic bottles are measured for one plastic bottle at a time by a measuring device and data thereof is fed back to one heater at a time, it is not necessary to mold a large number of plastic bottles beforehand to obtain data about the wall thicknesses of the plastic bottles. Therefore, a large number of plastic bottles are not discarded and a long time is not spent to obtain the data about the wall thicknesses of the plastic bottles.

According to the present embodiment, when the actually measured temperature at one measurement point P of a preform 10 differs from the optimal temperature at the one measurement point P by a certain value or greater, the control unit 70 controls one heating body 65 that is provided in correspondence with the one measurement point P. Therefore, it is possible to selectively control only the target heating body 65 without influencing the other heating bodies 65.

Note that, in the embodiment above, an example in which the control unit 70 controls only one heating body 65 that is provided in correspondence with one measurement point P is described. However, it is not limited thereto. When the actually measured temperature at one measurement point P of a preform 10 differs from the optimal temperature at the one measurement point P by a certain value or greater, the control unit 70 may control not only the one heating body 65 that is provided in correspondence with the one measurement point P but also another heating body 65.

For example, it is assumed that the actually measured temperature at the fourth measurement point P4 differs from its optimal temperature by a certain value or greater. In this case, when the output of the fourth heating body 65*d* that is provided in correspondence with the fourth measurement point P4 is increased (reduced), the temperature of the third measurement point P3 and the temperature of the fifth measurement point P5, the third measurement point P3 and the fifth measurement point P5 being adjacent to the fourth measurement point P4, are also increased (reduced). Therefore, the output of the fourth heating body 65*d* may be increased (reduced) and the output of the third heating body 65*c* and the output of the fifth heating body 65*e* may be reduced (increased) to suppress an increase (a reduction) in the temperature of the third measurement point P3 and the temperature of the fifth measurement point P5. Alternatively, the width of an increase (a reduction) in the output of the fourth heating body 65*d* may be suppressed to a small width, and the output of the third heating body 65*c* and the output of the fifth heating body 65*e*, the third heating body 65*c* and the fifth heating body 65*e* being adjacent to the fourth heating body 65*d*, may also be increased (reduced).

A plurality of structural elements that are disclosed in the embodiment and modifications above can be combined as appropriate when necessary. Alternatively, some of the structural elements may be removed from among all of the structural elements that are described in the embodiment and modifications above.

The invention claimed is:

1. A plastic bottle manufacturing device comprising:
   a preform heating part that heats a preform and that includes a plurality of heating bodies disposed in a longitudinal direction of the preform;
   a blow-molding part that molds a plastic bottle by blow-molding the preform heated by the preform heating part;
   a preform temperature measuring part that is provided between the preform heating part and the blow-molding part and that measures temperatures of the preform at a plurality of measurement points in the longitudinal direction of the preform; and
   a control unit that is connected to the preform temperature measuring part and that controls the preform heating part,
   wherein positions of the plurality of measurement points are provided in correspondence with positions of the plurality of heating bodies, wherein the control unit controls an output of each heating body of the preform heating part based on an optimal temperature distribution at each measurement point of the preform that has been predetermined and an actually measured temperature distribution at each measurement point of the preform measured by the preform temperature measuring part, and wherein the control unit divides the preform into a plurality of zones in the longitudinal direction, wherein a number of the zones, a number of the measurement points and a number of the heating bodies are the same each other, and wherein the control unit sets each measurement point at a location at which a temperature is highest in the corresponding one of the zones.

2. The plastic bottle manufacturing device according to claim 1, wherein the preform temperature measuring part is a thermography device.

3. The plastic bottle manufacturing device according to claim 1, wherein, when an actually measured temperature at one measurement point of the preform differs from an optimal temperature at the one measurement point by a certain standard value or greater, the control unit controls the output of one heating body that is provided in correspondence with the one measurement point.

4. The plastic bottle manufacturing device according to claim 3, wherein, when the actually measured temperature at the one measurement point of the preform differs from the optimal temperature at the one measurement point by the certain standard value or greater, the control unit controls the output of the one heating body that is provided in correspondence with the one measurement point and the output of another heating body differing from the one heating body.

5. A plastic bottle manufacturing method comprising:
a preform heating step of heating a preform by a preform heating part that includes a plurality of heating bodies disposed in a longitudinal direction of the preform;
a blow-molding step of molding a plastic bottle by blow-molding the preform that has been heated; and
a preform temperature measuring step of measuring temperatures of the preform at a plurality of measurement points in the longitudinal direction of the preform, the preform temperature measuring step being provided between the preform heating step and the blow-molding step, wherein positions of the plurality of measurement points are provided in correspondence with positions of the plurality of heating bodies, wherein an output of each heating body of the preform heating part is controlled based on an optimal temperature distribution at each measurement point of the preform that has been predetermined and an actually measured temperature distribution at each measurement point of the preform, and wherein the preform is divided into a plurality of zones in the longitudinal direction, wherein a number of the zones, a number of the measurement points and a number of the heating bodies are the same each other, and wherein each measurement point is set at a location at which a temperature is highest in a corresponding one of the zones.

* * * * *